United States Patent

[11] 3,570,741

[72] Inventors Vicent A. Corsaro
Haverhill;
Norman F. Smith, Methuen, Mass.
[21] Appl. No. 745,254
[22] Filed July 16, 1968
[45] Patented Mar. 16, 1971
[73] Assignee Western Electric Company Incorporated
New York, N.Y.

[54] LEVEL CONTROL SYSTEM FOR LIQUID SOLDER
12 Claims, 2 Drawing Figs.

[52] U.S. Cl. .................................................. 228/40,
29/471.1, 73/304, 73/308, 228/36
[51] Int. Cl. ..................................................... B23k 1/08
[50] Field of Search........................................ 228/8, 40,
36; 73/308, 307, 309; 29/471.1

[56] References Cited
UNITED STATES PATENTS
1,947,689  2/1934  Young............................  228/8
3,218,193  11/1965 Isaacson........................  228/37X
3,386,166  6/1968  Tardoskegyi..................  228/37X

*Primary Examiner*—John F. Campbell
*Assistant Examiner*—Robert J. Craig
*Attorneys*—H.J. Wiegar, R.P. Miller and A.J. Nugent

ABSTRACT: Two drag chains advance a succession of articles over a cast iron displacement block toward floating contact with molten solder in a solder tank. The block is partially submerged in the molten solder. The displacement block is heated by the molten solder and, as a result, preheats the advancing articles by radiation. Two probes are located at predetermined normal working level limits for the solder in the tank. A control circuit, including the probes and a motor, regulates the vertical position of the displacement block, normally maintaining the solder level within the predetermined limits. A third, overflow preventing probe causes the circuit to actuate the motor, lowering the solder level when the probe is contacted by solder.

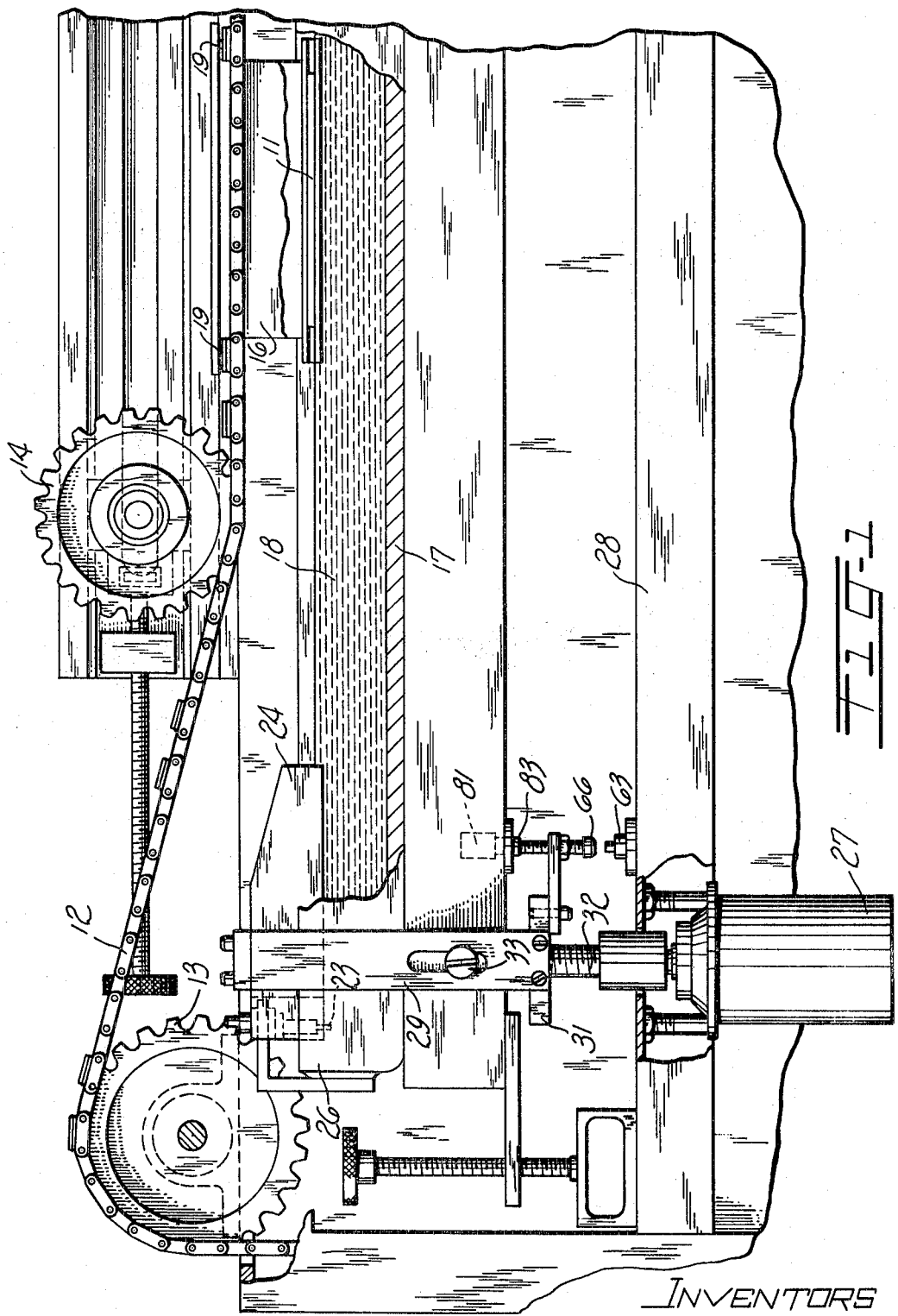

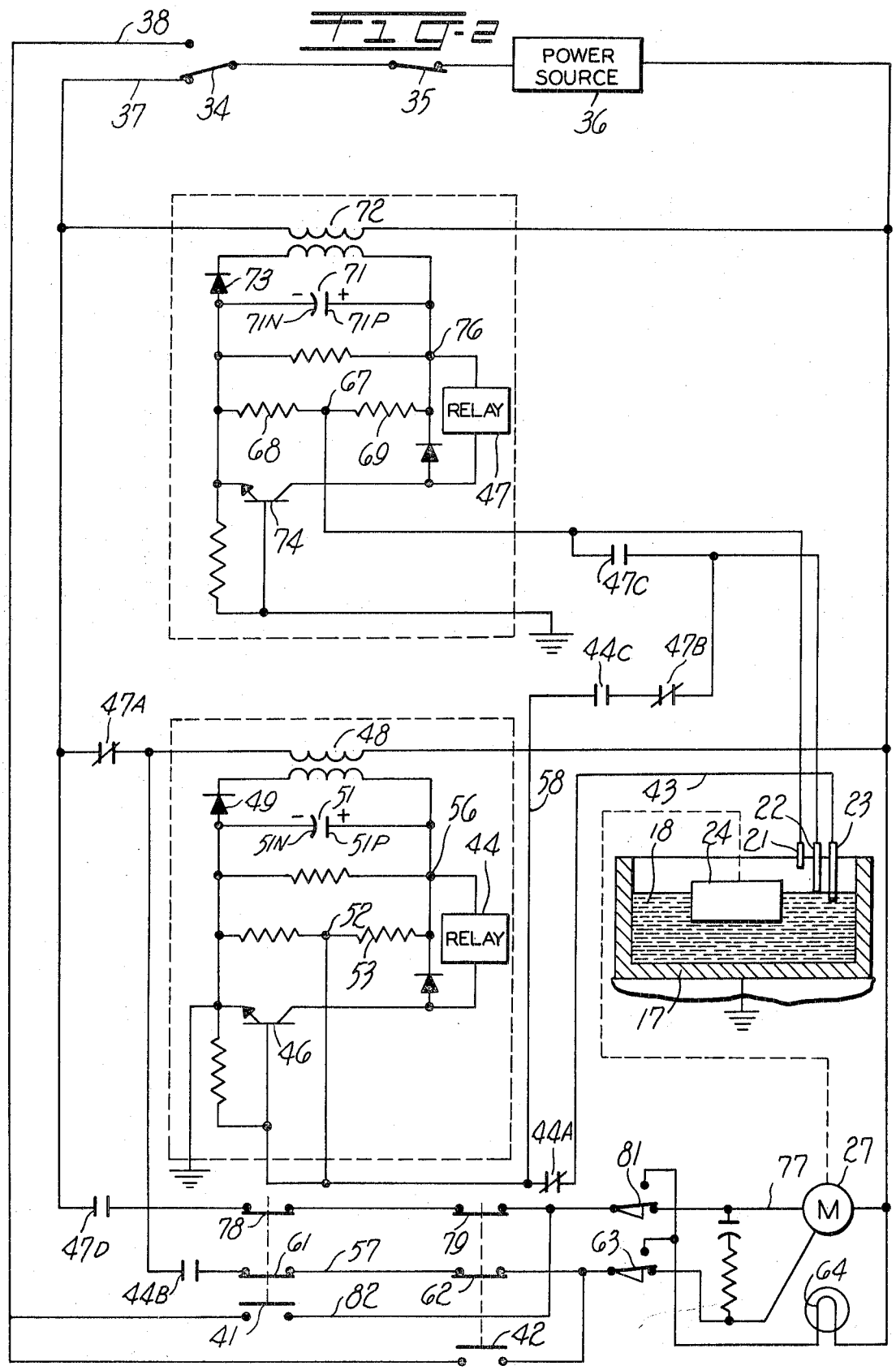

LEVEL CONTROL SYSTEM FOR LIQUID SOLDER

BACKGROUND OF THE INVENTION

This invention relates to level control systems for fluent material and, more particularly, to level control systems useful in maintaining molten solder within a predetermined range of levels in apparatus for soldering articles.

In the soldering of articles, such as printed circuit boards, it is known to use a dragline soldering system wherein the articles are supported by advancing draglines or chains and are moved into contact with molten solder in a tank. It is desirable that the level of molten solder in the tank be maintained within prescribed limits to assure proper contact between the advancing articles and the solder. This is especially true with respect to a dragline soldering operation wherein the articles are advanced by the chains into contact with the solder and then float upon the top surface of the solder while being dragged along by the moving lines or chains. A dragline soldering system wherein the articles float upon the top surface of the solder is disclosed in a copending application, Ser. No. 745,254, on a Method and Apparatus for Treating Articles with a Liquid, of V. A. Corsaro, filed concurrently with the instant application.

In a floatation-type dragline soldering system, such as that of the concurrently filed V. A. Corsaro application referred to above, each article is mounted to move vertically to a limited degree with respect to the draglines or chains, such that flotation of the articles may occur. The solder lever, therefore, must not rise above a predetermined upper working level during the soldering operation. This is due to the fact that the articles might literally float off of the chain if the maximum limit for vertical movement of the articles with respect to the chains is exceeded. The use of devices positively fixing limits for upward movement of the articles with respect to the chains to prevent the escape of the floating articles from the chains is under undesirable. Such arrangement might result in immersion of the articles into the molten solder to such depth that the solder would contact portions of the articles not designed to undergo such contact.

In a dragline soldering system, it is also necessary that the solder level never fall below a predetermined lower limit, such that the articles, while supported by the chain, might be advanced over the top surface of the solder without proper contact of the articles with the solder.

Additionally, an operator from time to time may add blocks of solid solder to the tank in order to replenish solder applied to the advancing articles. Thus, provision against overflow of molten solder from the tank is desirable. A topmost limit for the solder in the tank, above the predetermined normal upper working level, should be afforded by the system.

It is known, moreover, that in treating relatively cool articles with molten solder, a destructive thermal shock condition may be experienced unless some provision is made for preheating the articles prior to their contact with the solder. Prior art devices utilize separate heating mechanisms for this purpose. A compact and efficient preheating mechanism, not utilizing a separate power consuming heater, is desirable.

SUMMARY OF THE INVENTION

An object of the invention resides in new and improved apparatus for soldering articles.

The invention contemplates the use of a displacement block movable vertically in a solder tank to control the level of solder in the tank within predetermined limits. The solder level is regulated by controlled positioning of the block in order to vary the quantity of solder displaced by the block with each repositioning of the block. Downward movement of the displacement block into the molten solder will raise the solder level, while upward movement of the displacement block will lower the solder level. A level sensing and controlling system provides the required movements to the displacement block to maintain the solder level within the predetermined limits, particularly between a normal upper working level and a lower limit for the solder. A topmost, overflow limiting solder level limit is also provided by the control system.

The displacement block is preferably made of a heat radiating material. The articles are moved past the displacement block prior to contact of the articles with the molten solder. Heat is absorbed by the block from the molten solder and is radiated to preheat the advancing articles. Thus, the use of inefficient, separate preheating mechanisms is avoided.

BRIEF DESCRIPTION OF THE DRAWING

FIG. 1 is a side elevational view illustrating portions of an apparatus constructed in accordance with the principles of the invention for applying solder to articles and including mechanisms for preheating the articles prior to contact of the articles with the solder and for controlling the level of solder in a solder tank; and FIG. 2 is a circuit diagram showing a control circuit which may be used to operate the apparatus of FIG. 1 in order to regulate the level of solder in the solder tank.

DETAILED DESCRIPTION

Referring to FIG. 1, there is illustrated a dragline apparatus for soldering articles, such as a printed circuit board 11. The apparatus includes a pair of link chains 12 (only one shown) and several associated sprocket wheels 13, 14, etc. The chains 12 support a number of carriers 16, in which the articles 11 are retained. The chains are advanced, while in engagement with the sprocket wheels, to move or drag the articles toward and across a heated solder pot or tank 17. The carriers 16 are supported by the chains 12 such that the articles 11 are in contact with molten solder 18 in the solder tank 17 as the chains move across the tank. The carriers are preferably supported on the chains by pins 19 engaging lateral extensions on certain links of the chains 12. The pins are vertically movable relative to the chains such that the articles 11 and the carriers 16 float freely on the top surface of the solder 18. The basic dragline soldering apparatus is more fully disclosed in a copending application, Ser. No. 745,254, on a Method and Apparatus for Treating Articles with a Liquid, of V. A. Corsaro, filed concurrently with the instant application.

It is desired that the level of the molten solder in the tank normally be maintained within predetermined limits. The normal working boundaries for the solder level are defined primarily by the range of permissible vertical displacement for the article carries 16 (FIG. 1) with respect to the chains 12. Obviously, the pins 19 must continue to engage the driving links of the chains 12 while the articles 11 and the carriers 16 are floating on the top surface of the molten solder 18 in the solder tank 17. The maximum permissible vertical displacement of the floating article carriers, thus, must be less than the length of the pins 19. Additionally, an operator from time to time may add blocks of solder to the tank to replenish solder applied to the advancing articles. Thus, it is desirable to provide a topmost limit for the level of solder such that the molten solder in the tank will not overflow.

Three vertically spaced probes 21, 22 and 23 (FIG. 2) extend downwardly into the solder tank 17. The three probes are made of any suitable electrically conductive material, e.g., cast iron or stainless steel, not adversely affected by contact with the molten solder. The probes are preferably mounted on an edge of the solder tank and are electrically insulated from the tank, which is electrically grounded, and from each other. A topmost or upper probe 21 is positioned extending into the solder tank 17 such that the bottom edge of the probe 21 corresponds to the predetermined topmost solder level. In the ordinary operation of the apparatus, the upper probe 21 will be above, and out of contact with, the top surface of the solder 18.

A middle or intermediate probe 22 is positioned extending into the solder tank 17 such that the bottom edge of the probe 22 corresponds to the predetermined normal upper working level for the solder, i.e., that level above which the articles 11 and article carriers 16 might float so high on the top surface of the solder 18 that the pins 19 would be lifted completely off of the laterally extending links of the dragline chain 12. In the ordinary operation of the apparatus, the intermediate probe 22 will either just touch the top surface of the solder 18 or be above, and out of proper contact with, such top surface.

A bottommost or lower probe 23 is positioned extending into the solder tank 17 such that the bottom edge of the probe 23 corresponds to the predetermined normal lower working level or lower limit for the solder, i.e., that level below which the article carriers might be suspended upon the drag link chains 12 with the articles 11 not extending downwardly into the tank 17 sufficiently far to contact the top surface of the solder 18. In the ordinary operation of the apparatus, the lower probe 23 will be partially immersed in molten solder in the tank 17.

Briefly reviewing, the bottom edges of the upper and lower probes 21 and 23, respectively, correspond to predetermined upper and lower solder level limits, while the bottom edge of the probe 22 corresponds to a normal upper working level for the ordinary operation of the soldering apparatus, i.e., during soldering of successively advance articles 11.

A displacement block 24 is made of any suitable heat radiating substance, for example, cast iron, which will not be adversely affected to any appreciable degree by contact with the molted solder 18 in the tank 17. The displacement block is located adjacent one end 26 of the solder tank, the end 26 being an end of the tank over which the chains 12 advance the articles 11 prior to contact of the articles with the molted solder. A reversible electric motor 27 is associated with the displacement block 24, functioning under the control of an electrical circuit (FIG. 2) to lower or raise the block in the tank 17. Variations in the vertical position of the block will vary the level of the molten solder 18, since the block, once repositioned, displaces more or less solder than previously. The motor 27 is mounted on a frame 28, which also supports the solder tank 17.

The displacement block 24 is mounted for vertical movement with a pair of side bars 29 (only one shown) which are located one on each side of the solder tank 17. A crossbar 31 joins the two side bars 29 beneath the tank. The crossbar 31 has a threaded bore extending vertically therethrough and mating with an externally threaded shaft 32. The shaft 32 is rotated by the motor 27 in order to displace the crossbar 31, the side bars 29 and the displacement block 24 vertically. The side bars are slotted to receive guide pins 33 (only one shown) extending from the frame 28. The guide pins 33 restrain the side bars 29 against any displacement other than the vertical displacement caused by the internally threaded crossbar 31 moving axially along the externally threaded shaft 32 upon rotation of the motor 27.

The solder level control circuit of FIG. 2 is operable in either of two modes. In a first mode, a manually operable switch 34 is positioned to couple a power source 36, for example, a source of alternating current, through an on-off switch 35 to a first line 37, as shown. The control circuit, when operating in this first mode, will respond automatically to signals from the three probes 21, 22 and 23. The control circuit will operate the motor 27 to move the displacement block 24 so as to control the level of molten solder 18 in the tank 17 within the predetermined limits. In a second mode, the switch 34 is repositioned to couple the power source to a second line 38. In this second mode, the motor 27 may be manually controlled by the operator through manipulation of a pair of switches 41 and 42. Thus, the displacement block 24 may be lowered or raised in order to control the level of the molten solder 18 in the tank 17, as desired by the operator.

In the operation of the apparatus, with the circuit of FIG. 2 in the automatic mode, as shown, a succession of articles 11 (FIG. 1) on carriers 16 are placed, either manually or by conventional feeding mechanisms onto the chains 12. The chains advance the articles 11 over the heat radiating displacement block 24 and then across the top surface of the molten solder 18 in the tank 17. The displacement block extends downwardly into the molten solder, so that the top surface of the displacement block is at a temperature substantially the same as that of the solder. The relatively cool articles 11 are heated by radiation from the top surface of the relatively hot displacement block prior to contact of the articles with the molten solder. The preheating effect caused by passage of the articles over the heat radiating displacement block has been found effective to reduce thermal shock to the articles upon contact with the molten solder in the tank 17.

It is assumed now that apparatus is operating with the tope level of solder in the tank 17 below the bottom edge of the intermediate probe 22 and above the bottom edge of the lower probe 23, i.e., within the predetermined range of working levels. The advance, preheating and soldering of successive articles 11 continues with the motor 27 not being energized and the displacement block remaining in a fixed vertical position relative to the tank 17. The lower probe 23 is electrically grounded through the solder and the tank 17. The upper and middle probes 21 and 22, respectively, are isolated from ground.

A line 43 couples the grounded lower probe 23, through a normally closed contact 44A of a relay 44, with the base of an NPN-type transistor 46. The emitter of the transitor 46 is coupled directly to ground, while the collector of the transistor 46 is coupled to the winding of the relay 44.

The line 37 is coupled, through a normally closed contact 47A of a relay 47 and the primary winding of a transformer 48, to complete a circuit across the power source 36. The secondary winding of the transformer 48 is coupled through a diode 49 across a capacitor 51. Thus, one plate 51P of the capacitor 51 is maintained at a positive potential and the other plate 51N is maintained at a negative potential so long as the transformer 48 remains energized through the switch 34, the line 37 and the contact 47A.

The base of the transistor 46 is coupled through a junction 52 and a resistor 53 to the positive plate 51P of the capacitor 51. The constantly grounded emitter of the transistor 46 is coupled to the negative plate 51N of the capacitor. So long as the lower probe 23 continues to be grounded by contact with the molten solder 18 in the tank 17, the base-emitter path of the transistor 46 will continue to be short circuited and the transistor will be nonconductive. Once ground is removed from the lower probe 23, however, by the solder falling below the predetermined lower lever, the base of the transistor 46 will be rendered positive with respect to its emitter via the capacitor plate 51P, the resistor 53 and the junction 52.

It is assumed now that the level of solder has dropped below the predetermined lower limit. Thus, ground is removed from the lower probe 23 and the transistor 46 is rendered conductive. The relay 44 is, thereupon, energized from the capacitor 51 through a junction 56 and the collector-emitter path of the transistor 46. Energization of the relay 44 opens the normally closed contact 44A, and closes normally open contacts 44B, in a line 57, and 44C, in a line 58.

The closing of the contact 44B energizes the motor 27 through the normally closed contact 47A, a pair of normally closed switches 61 and 62 and the depicted lower position of a switch 63. The motor begins to rotate the threaded shaft 32 (FIG. 1) in a direction selected to move the crossbar 31, the side bars 29 and the displacement block 24 downwardly. The level of molten solder 18 in the tank 17 begins to rise as the displacement block is lowered to submerge the block further into the solder.

The lower probe 23 again comes into contact with the solder. The open contact 44A (FIG. 2), however, now isolates the lower probe from the base of the transitor 46, so that the grounding of the lower probe can have no effect upon the continued energization of the motor 27. The displacement block 24 continues to move downwardly and the level of molten solder in the tank 17 continues to rise.

The level of molten solder rises until the intermediate probe 22 comes into contact with the solder, this contact grounding the probe 22. Ground is reintroduced onto the base of the transistor 46 from the probe 22 by way of a normally closed contact 47B of the relay 47 and the presently closed contact 44C. The base and emitter of the transistor 46 are now both grounded, rendering the transistor 46 once again nonconductive and deenergizing the relay 44. The contact 44A is again closed, while the contacts 44B and 44C reopen. The reopening of the contacts 44B and 44C deenergizes the motor 27 and reisolates the intermediate probe 22 from the base of the transistor 46, respectively, while the reclosing of the contact 44A recouples the normally grounded lower probe 23 to the base of the transistor 46.

Continued operation of the soldering apparatus will result in one or several intermittent downward movements of the displacement block 24, raising the level of molten solder 18 to contact the bottom edge of the intermediate probe 22 after each instance of the solder level falling below the bottom edge of the lower probe 23. This will maintain the working level of molten solder within the predetermined range of levels. The total quantity of molten solder in the solder tank 17, however, will gradually be depleted.

The gradual loss of solder will be reflected in downward changes in the position of the displacement block 24. Such changes in position may be observed by the operator, who may introduce blocks of solid solder into tank 17 to replenish the lost solder. Alternatively, automatic solder replenishing mechanisms may be used.

Preferably, a warning lamp is also used to indicate to the operator that additional solder should be added. The lamp 64 is lighted upon movement of the displacement block 24 below a predetermined position. Upon such movement, an actuator 66 (FIG. 1), which is carried by the crossbar 31, will operate the switch 63 to a second position thereof. The switch 63 will now couple the lamp 64 (FIG. 2), rather than the motor 27, across the power source 36 through the switch 34, the line 37, the closed contacts 47A and 44B and the switches 61 and 62. The warning lamp 64 will, therefore, be lighted. Alternatively, such automatic solder replenishing mechanisms as are utilized may replace, or be couple in parallel with, the lamp 64, to be activated by the repositioning of the switch 63, suitable provision being made for the switch 63 to reassume its normal position during the replenishing operation without reenergizing the motor 27 to tend to move the displacement block downward.

Replenishment of the solder, either automatically or by the addition of solid blocks of solder by the operator, is intended to bring the solder level up far enough to contact the bottom edge of the upper probe 21. Such contact will cause the FIG. 2 control circuit to operate, raising the displacement block 24 in order to lower the level of solder to just below the bottom edge of the intermediate probe 22. Since the displacement block 24 should be raised by the control circuit with replenishment, in order to allow for subsequent downward, level controlling movement of the block, the operator should not discontinue replenishment prior to the solder contacting the upper probe 21. Moreover, in order that a large amount of solder may be added to that already in the solder tank 18, and in order that a large upward movement may be given the displacement block 24, the bottom edge of the upper probe 21 is preferably positioned relatively close to the top of the solder tank 17. The upper probe 21 will function, in this position, to prevent overflow of solder from the tank. If the gap between the upper probe 21 and the intermediate probe 22 is substantially greater than that between the intermediate probe 22 and the lower probe 23, the displacement block 24 will be raised sufficiently during a solder replenishment operation such that the motor 27 may subsequently lower the block 24 intermittently several times before an additional replenishment operation is necessary.

A replenishing operation will cause the upper probe 21 to be contacted by the grounded molten solder 18. This will result in the grounding of a junction 67 between a pair of resistors 68 and 69 coupled in series across a capacitor 71. The primary winding of a transformer 72 is coupled across the power source 36 through the switch 34 and the line 37. The secondary winding of the transformer 72 is coupled across the capacitor 71 with a diode 73 rendering one plate 71P of the capacitor positive and the other plate 71N negative. The emitter of an NPN-type transistor 74 is coupled to the negative capacitor plate 71N, while the base of the transistor 74 is grounded.

In the absence of a ground on the junction 67, the positive plate 71P of the capacitor 71 is isolated from the base of the transistor 74, so that the transistor is nonconductive. Upon the grounding of the junction 67, the base of the transistor 74 will be driven positive with respect to the emitter of the transistor. Thus, grounding of the upper probe 21 by the solder 18 will render the transistor 74 conductive. This will cause energization of the relay 47 from the capacitor 71 through a junction 76 and the collector-emitter path of the transistor 74. Energization of the relay 47 will open the normally closed contacts 47A and 47B, while closing normally open relay contacts 47C and 47D.

The opening of the contacts 47A and 47B will disable the transformer 48 to isolate the portion of the control circuit, including the solder level raising relay 44, from both the power source 36 and the intermediate probe 22. The closing of the contacts 47C and 47D, respectively, will couple the intermediate probe 22 to the junction 67 and energize the motor 27 through a line 77 which runs from the contact 47D through normally closed switches 78 and 79 and the depicted lower position of a switch 81. Energization of the motor 27 through the line 77 will cause the threaded shaft 32 (FIG. 1) to rotate in a direction selected to move the crossbar 31, the side bars 29 and the displacement block 24 upwardly.

Upward movement of the displacement block 24 will cause the level of solder 18 to drop. The level will continue to drop so long as the junction 67 (FIG. 2) is grounded from the intermediate probe 22 through the closed contact 47C.

When the displacement block 24 is raised to a position such that the bottom edge of the intermediate probe 22 no longer is contacted by the solder 18 in the tank 17, ground is removed from the junction 67. As a result, the base of the transistor 74 is no longer maintained positive with respect to the emitter of the transistor. Thus, the transistor 74 returns to its initial nonconductive state. The relay 47 is, therefore, deenergized, causing the reclosing of the contacts 47A and 47B and the reopening of the contacts 47C and 47D.

The reopening of the contact 47D deenergizes the motor 27 to terminate the upward movement of the displacement block 24. The circuit is now restored to its initial condition, as shown in FIG. 2, with the top surface of the molten solder 18 being located just below the bottom edge of the intermediate probe 22. The apparatus is now ready to reassume its normal working operation with the solder level again maintained between the bottom edges of the lower and intermediate probes 23 and 22, respectively.

As stated above, the apparatus may also be operated in a second mode, i.e., with the manually operable switch 34 positioned to couple the power source 36 to the line 38. The level of the displacement block 24 may be raised by the manual closing of the normally open switch 41 or lowered by the manual closing of the normally open switch 42, as the operator may desire. The normally closed switches 61 and 78 are ganged with the switch 41 to be opened when the switch 41 is closed. Similarly, the normally closed switches 62 and 79 are ganged with the switch 42 to be opened when the switch 42 is closed.

With the circuit operating in its second mode, the closing of the switch 41 will energize the motor 27 through the line 38, a line 82, the depicted lower position of the switch 81 and the line 77 to raise the displacement block 24. The displacement block will continue to move upwardly until the motor 27 is deenergized. Such deenergization will occur when either the switch 41 is reopened by the operator or a movement limiting actuator 83 (FIG. 1), carried by the crossbar 31, moves the switch 81 to its upper position, as shown in FIG. 2. The switch 81, in its depicted upper position, will cause the warning lamp 64 to be lighted.

Similarly, with the circuit operating in its second mode, the closing of the switch 42 will energize the motor 27 through the line 38 and the depicted lower position of the switch 63 to lower the displacement block 24. The displacement block will continue to move downwardly until either the switch 42 is reopened by the operator or the actuator 66 (FIG. 1) moves the switch 63 to its upper position, as shown in FIG. 2, to deenergize the motor 27 and light the warning lamp 64.

It is to be understood that the above-described apparatus is simply illustrative of one embodiment of the invention. Another embodiment in accordance with the principles of the invention might also provide a three-probe level control system. This system might utilize the upper and lower probes to define upper and lower working level limits for the solder, with the intermediate probe acting only as a motor shutoff mechanism. Such system could tolerate replenishment of the solder to a level between the intermediate and upper probes. such replenishment might occur with articles 11 supported on the chains 12. Many other modifications may be made without departing from the invention.

We claim:

1. In apparatus for applying solder to an article:
   a tank for containing molten solder, the tank having an entry section;
   means for advancing the article past said entry section and then into contact with the solder;
   a block of heat radiating material;
   means mounting the block partially submerged within said entry section for movement downwardly to raise and upwardly to lower the surface level of the solder, the mounting means positioning the block in juxtaposition to the path of advance of the article to radiate heat and preheat the article prior to advance of the article into contact with the solder; and
   means responsive to variations in the level of the solder for moving the block selectively into and out of the solder to maintain the level of the solder within predetermined upper and lower limits.

2. In apparatus as set forth in claim 1 means rendered effective during movement of the block and responsive to solder attaining a predetermined level intermediate said predetermined upper and lower limits for terminating movement of the block to maintain the solder at said predetermined intermediate level.

3. In a dragline soldering apparatus:
   an elongated solder tank;
   a block of heat radiating material positioned at one end of said tank to be heated by molted solder in the tank;
   means for advancing an article past the heated block and then into contact with molten solder in the tank;
   means mounting the block for vertical movement in said tank;
   means rendered effective upon the level of solder in said tank falling below a predetermined lower limit for displacing the block downwardly to raise the level of solder in said tank; and
   means rendered effective upon the level of solder in said tank rising above a predetermined upper limit for displacing the block upwardly to lower the level of solder in said tank.

4. In apparatus as set forth in claim 3:
   said means for displacing the block downwardly comprising a first probe extending to a first vertical level in the tank corresponding to said predetermined lower limit; and
   said means for displacing the block upwardly comprising a second probe extending to a second vertical level in said tank corresponding to said predetermined upper limit.

5. In apparatus as set forth in claim 3:
   means effective with the block being displaced in said tank and responsive to the level of solder in the tank attaining a predetermined normal upper working level between said predetermined lower limit and said predetermined upper limit for terminating displacement of the block in said tank.

6. In apparatus as set forth in claim 5:
   said means for displacing the block downwardly comprising a first probe in said tank;
   said means for displacing the block upwardly comprising a second probe in said tank at a lower level than said first probe; and
   said means for terminating displacement of the block comprising a third probe in said tank intermediate said first and second probes.

7. In a system for controlling the height of a variable level, electrically conductive, fluent material in a reservoir:
   means associated with the reservoir for electrically grounding the fluent material contained therein;
   an upper probe of electrically conductive material extending into the reservoir to a predetermined maximum level limit for the fluent material;
   a lower probe of electrically conductive material extending into the reservoir to a predetermined minimum level limit for the fluent material;
   an intermediate probe of electrically conductive material extending into the reservoir to a predetermined operating level for the fluent material intermediate said maximum and minimum levels;
   means electrically insulating said three probes from the reservoir and from each other;
   means including an electric circuit responsive to a grounding of said upper probe through the fluent material for lowering the level of fluent material in the reservoir;
   means including an electric circuit responsive to a removal of ground from said lower probe by removal of the fluent material therefrom for raising the level of fluent material in the reservoir; and
   means including an electric circuit responsive to a change in condition of said intermediate probe to remove ground from said intermediate probe or to ground said intermediate probe for deactivating said level lowering means and said level raising means.

8. In a level control system as set forth in claim 7, wherein the fluent material in the reservoir is molten solder;
   said level lowering means and said level raising means both including a block of heat radiating material displaced vertically in the molten solder to vary the solder level in the reservoir; and
   means for conveying an article first past said block to be heated by radiation therefrom and then into contact with the molten solder in the reservoir.

9. In apparatus for applying solder to an article:
   a tank for containing molted solder, the tank having an entry section;
   means for advancing the article across said entry section and then into contact with solder in the tank;
   a body of heat radiating material;
   means for mounting the body of heat radiating material partially submerged in molten solder in said entry section to transmit heat from the solder to the article advance across the entry section toward contact with the solder; and
   means responsive to a variation in the level of solder in the tank across a predetermined limit level for moving the body of heat radiating material vertically in a direction selected to bring the level of solder in the tank within said predetermined limit lever.

10. In a system for soldering articles successively advanced into contact with molten solder in a bath:
   first sensor means for generating a signal indicative of a level of the solder in the bath below a predetermined lower limit;

second sensor means for generating a signal indicative of a level of the solder in the bath above a predetermined upper limit;

third sensor means for generating a signal indicative of a change in the level of solder in the bath to vary across a predetermined intermediate level between said predetermined lower and upper limits;

a displacement block mounted for vertical movement in the bath;

means responsive to a signal from said first sensor means for lowering and displacement block to raise the level of solder in the bath;

means responsive to a signal from said second sensor means for raising the displacement block to lower the level of solder in the bath; and means rendered effective during movement of the displacement block and responsive to a signal from said third sensor means for terminating movement of the displacement block.

11. In a system as set forth in claim 10, the molten solder in the bath having a first temperature and the articles successively advanced into contact therewith having an initial second temperature lower than said first temperature:

said displacement block being composed of a heat radiating material disposed projecting partially out of the molten solder in the bath toward the advancing articles to preheat the advancing articles above said second temperature prior to contact of the articles with the solder.

12. In an apparatus for solder-coating elements projecting from the under surface of a planar mounting board;

a tank holding molten solder;

a block of heat radiating material partially submerged in the solder and having an upper heat radiating surface which is at an acute angle with respect to the surface of the solder;

a conveyor for advancing mounting boards along a path which is parallel to the heat radiating surface and then parallel to the surface of the solder; and means responsive to changes in the level of the solder for moving said block to maintain the level of the solder at a height sufficient to submerge the projecting elements while the mounting board is advancing parallel to the surface of the solder.